(12) United States Patent
Stokes

(10) Patent No.: US 10,125,922 B2
(45) Date of Patent: Nov. 13, 2018

(54) TREE MOUNTABLE BUCKET BRACKET

(71) Applicant: Richard Stokes, Pearcy, AR (US)

(72) Inventor: Richard Stokes, Pearcy, AR (US)

( * ) Notice: Subject to any disclaimer, the term of this patent is extended or adjusted under 35 U.S.C. 154(b) by 0 days.

(21) Appl. No.: 15/889,922

(22) Filed: Feb. 6, 2018

(65) Prior Publication Data

US 2018/0231178 A1    Aug. 16, 2018

Related U.S. Application Data

(60) Provisional application No. 62/458,074, filed on Feb. 13, 2017.

(51) Int. Cl.
*F16M 13/00* (2006.01)
*F16M 13/02* (2006.01)
*A01K 5/00* (2006.01)

(52) U.S. Cl.
CPC .............. *F16M 13/022* (2013.01); *A01K 5/00* (2013.01)

(58) Field of Classification Search
CPC ........ B66C 13/04; B66D 1/60; F16M 13/022; A01K 5/00
See application file for complete search history.

(56) References Cited

U.S. PATENT DOCUMENTS

| | | | |
|---|---|---|---|
| 5,232,188 A | 8/1993 | Troncone | |
| 5,862,777 A | 1/1999 | Sweeney | |
| 7,028,635 B1 | 4/2006 | Robert | |
| 7,191,732 B2 * | 3/2007 | Neal, Jr. | A01K 5/0225 119/51.01 |
| 7,341,507 B1 * | 3/2008 | Julian, Sr. | A22B 5/06 452/192 |
| 7,913,980 B1 * | 3/2011 | Cipriano | B66D 3/08 248/218.4 |
| 8,062,106 B1 * | 11/2011 | Adams, III | A01K 5/0291 452/189 |
| D747,562 S | 1/2016 | Alford | |
| 2007/0089932 A1 * | 4/2007 | Boyett | A01M 31/02 182/133 |
| 2008/0085669 A1 * | 4/2008 | Burrows | A22B 5/06 452/187 |
| 2014/0069339 A1 | 3/2014 | Dettore et al. | |

* cited by examiner

*Primary Examiner* — Amy J. Sterling
(74) *Attorney, Agent, or Firm* — Global Intellectual Property Agency, LLC; Daniel Boudwin

(57) ABSTRACT

A tree mountable bracket for suspending a bucket therefrom. The tree mountable bucket bracket includes a V-shaped member with a first segment and a second segment extended from a vertex point forming an angle. The first segment has a first bar attached distally from the vertex point. The first bar has a first end and a second end, the first end and the second end each have a hole. The second segment has a brace attached distally from the vertex point. A cable is secured in the hole of the first end of the first bar. An extension arm is attached via a hinge to the V-shaped member at a point adjacent to the vertex point opposite of the first and the second segment. The extension arm has a chain slot on an end distal to the hinge. A pulley is attached to the extension arm adjacent to the chain slot.

7 Claims, 3 Drawing Sheets

TREE MOUNTABLE BUCKET BRACKET

CROSS REFERENCE TO RELATED APPLICATIONS

This application claims the benefit of U.S. Provisional Application No. 62/458,074 filed on Feb. 13, 2017. The above identified patent application is herein incorporated by reference in its entirety to provide continuity of disclosure.

BACKGROUND OF THE INVENTION

The present invention relates to animal feeders which are used to attract animals to a desired location in order to care for them or to observe them from close proximity. Ideally, animal feeders release food above ground level from a tall object. Hanging animal feeders from tree branches is a common method of placing animal feeders, however this method is not ideal as tree branches can be unstable or dangerous.

A device that could be attached to the trunk of a tree, rather than suspended from a branch, is ideal in order to avoid the risk of injury to an animal or human in close proximity to the device. Current animal feeders do not disclose a device that would allow a single individual to mount a feeding bucket easily and securely to the trunk of a tree.

SUMMARY OF THE INVENTION

In view of the foregoing disadvantages inherent in the known types of animal feeders now present in the prior art, the present invention provides an apparatus wherein the same can be utilized for providing convenience for the user when hanging a bucket of animal feed.

The present system comprises a V-shaped member having a first segment secured to a second segment at a vertex point. The V-shaped member further includes a first bar having a fastener configured to secure the present invention to a trunk of a tree, wherein the first bar is attached to the first segment opposite the vertex point. A second bar is attached to the second segment opposite the vertex point and configured to serve as a brace when the present invention is secured to the tree. An extension arm is pivotally attached to the V-shaped member, offset from the vertex point. The extension arm is configured to rotate from a dismounted position to a mounted position in order to mount the device upon an upstanding column, such as a tree.

In one embodiment of this invention, the fastener is an adjustable cable that is made taut by rotating the extension arm from the vertical position to the horizontal position.

In another embodiment of this invention, the tree mountable bucket bracket further comprises a spring that is attached at its first end to the first segment of the V-shaped unit and at its second end to the extension arm.

In yet another embodiment, the tree mountable bucket bracket further comprises a pulley that is attached to the extension arm opposite the vertex point, as well as a second fastener that is connected to the pulley. In another embodiment, this pulley uses a block and tackle system. Additionally, the second fastener can be a hook for hanging a bucket.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
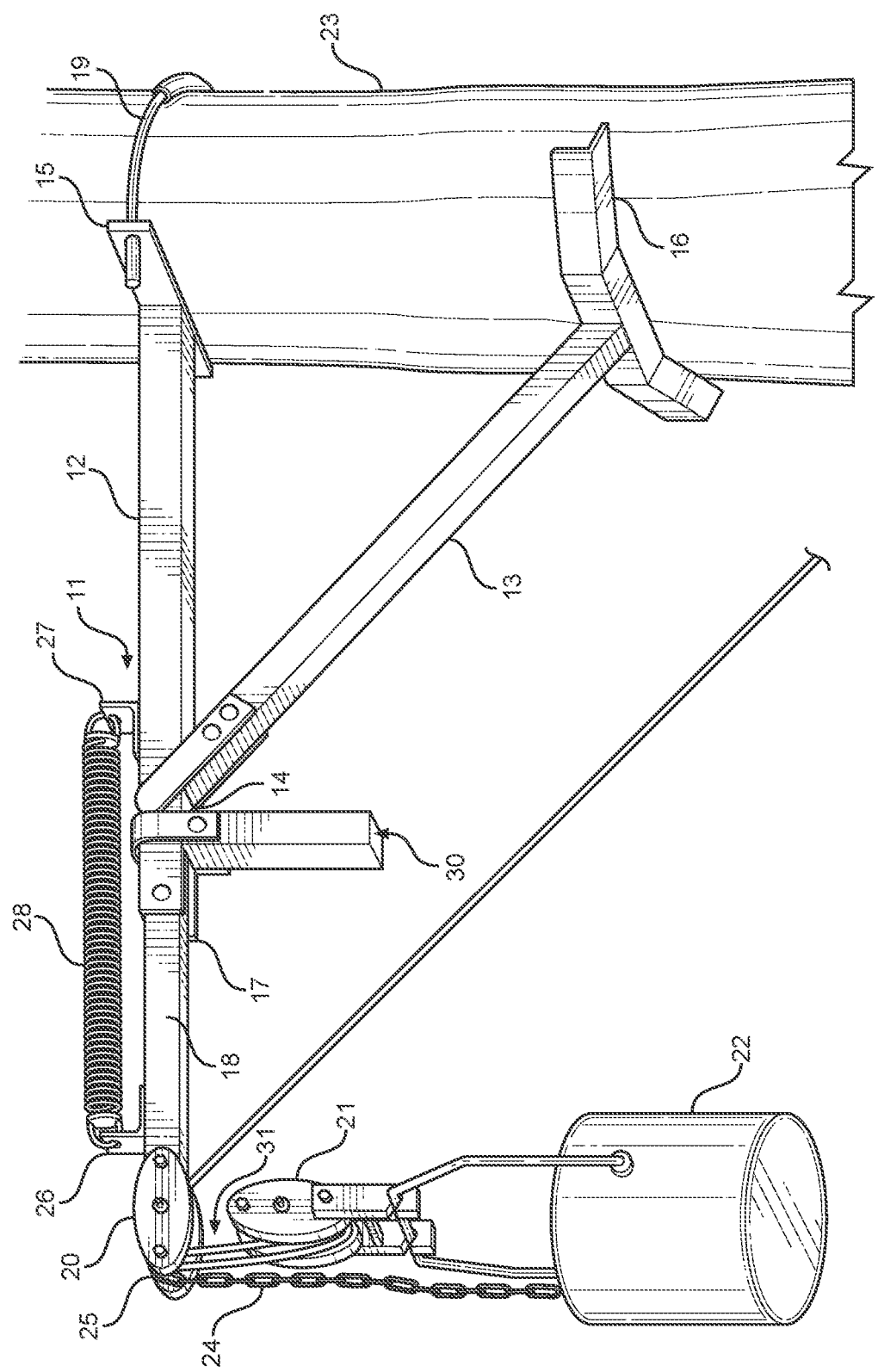
FIG. 1 shows a perspective side view of an embodiment of the tree mountable bucket bracket.

Reference is made herein to the attached drawings. Like reference numerals are used throughout the drawings to depict like or similar elements of the tree mountable bucket bracket for suspending a feed bracket therefrom. The figures are intended for representative purposes only and should not be considered to be limiting in any respect.

Referring now to FIG. 1, there is shown a perspective side view of an embodiment of the tree mountable bucket bracket. The tree mountable bucket bracket is comprised of a V-shaped member 11 having a first segment 12 connected to a second segment 13 by a vertex point 14 at an angle. In one embodiment, the first segment 12 interacts with the second segment 13 at an approximate 45 degree angle. A first bar 15 extends perpendicularly from an end of the first segment 12.

In the illustrated embodiment, the first bar 15 is secured to a distal end of the first segment 12 and extends perpendicularly therefrom. In the illustrated embodiment, the first bar 15 has a first end and a second end, wherein the first end and the second end each define a hole therein adapted to accommodate a cable 19 therethrough. The cable 19 is configured to pass through the hole of the first end of the first bar 15 and is secured by a ferrule stop or other cable stopping mechanism. Additionally, the cable 19 is configured to define a loop around a circumference of an upstanding column 23. Furthermore, the cable 19 is configured to pass through the hole of the second end of the first bar 15. In one embodiment, the cable 19 contains a protective sheath 29 configured to prevent damage to both the upstanding column 23 and the cable 19. When mounted upon an upstanding column 23, the first bar 15 frictionally engages the upstanding column 23 and supports the tree mountable bucket bracket in a cantilevered configuration.

The second segment 13 comprises a brace 16 extending from a free end of the second segment 13. When the tree mountable bucket bracket is engaged with the upstanding column 23, the brace 16 is configured to rest against the upstanding column 23 and to provide additional support to the tree mountable bucket bracket. When mounted upon an upstanding column 23, the first bar 15 and the brace are in a stacked configuration.

An extension arm 18 extending the vertex point 14 opposite of the first segment 12 and the second segment 13 and is connected by hinge 17 to the V-shaped member 11. The hinge 17 is located off center of the vertex point 14 opposite of the first segment 12 and the second segment 13. The extension arm 18 is connected to a pulley 20 positioned at the free end thereof. The free end of the extension arm further comprises a chain slot 25. The chain slot 25 is configured to receive an end of a chain 24 therein. The chain 24 is attached to the cable 19 and is configured to interact with the chain slot 25 to hold the cable in a tensioned position around an upstanding column 23.

In the illustrated embodiment, the cable 19, configured to form a loop around the upstanding column 23, extends to the extension arm 18 and is connected to the chain 24. In the illustrated embodiment, the chain is directly connected to the cable 19. As the extension arm 18 rotates perpendicular to the first segment 12, slack is provided to the cable 19 and the loop formed by the cable 19 increases in diameter. As the extension arm 18 rotates in alignment with the first segment 12, the loop decreases in diameter. Through these actions, the tree mountable bucket bracket may be mounted and dismounted, respectively, from the upstanding column 23. The diameter of the loop may be placed into a sustained position when the chain 24 is secured in the chain slot 25. The chain 24 is secured to the chain slot 25 by the interaction of a point of the chain slot with an aperture defined by a link of the chain 24.

In one embodiment, there is a hook device 21 that is suspended from the pulley 20. The hook device 21 can accommodate a bucket 22. A user would be able to place the bucket 22 filled with feed onto the hook device 21 to suspend the bucket 22 from a height that would be suitable for attracting wildlife. In the illustrated embodiment, the pulley 20 uses a block and tackle system. The block and tackle system allows the user to lift a weight that would otherwise be too difficult to lift manually. The block and tackle system would also enable a user to lower a heavier bucket for easier refilling. A block and tackle pulley system comprises a plurality of pulleys threaded by a single rope in a manner that enables a user to magnify the force they are applying to the rope to lift a desired target. In the illustrated embodiment, the pulley 20 is connected by a rope 31 to a hook device 21 comprised of a hook mounted onto a second pulley. In this embodiment, the user may pull the rope 31 downward and lift a bucket 22 connected to the hook device 21 upward. The rope 31 can be tied to an anchor to keep the bucket 22 suspended at the desired height. The rope 31 can also be tied around the upstanding column 23 to keep the bucket 22 suspended at the desired height.

Figure 2:
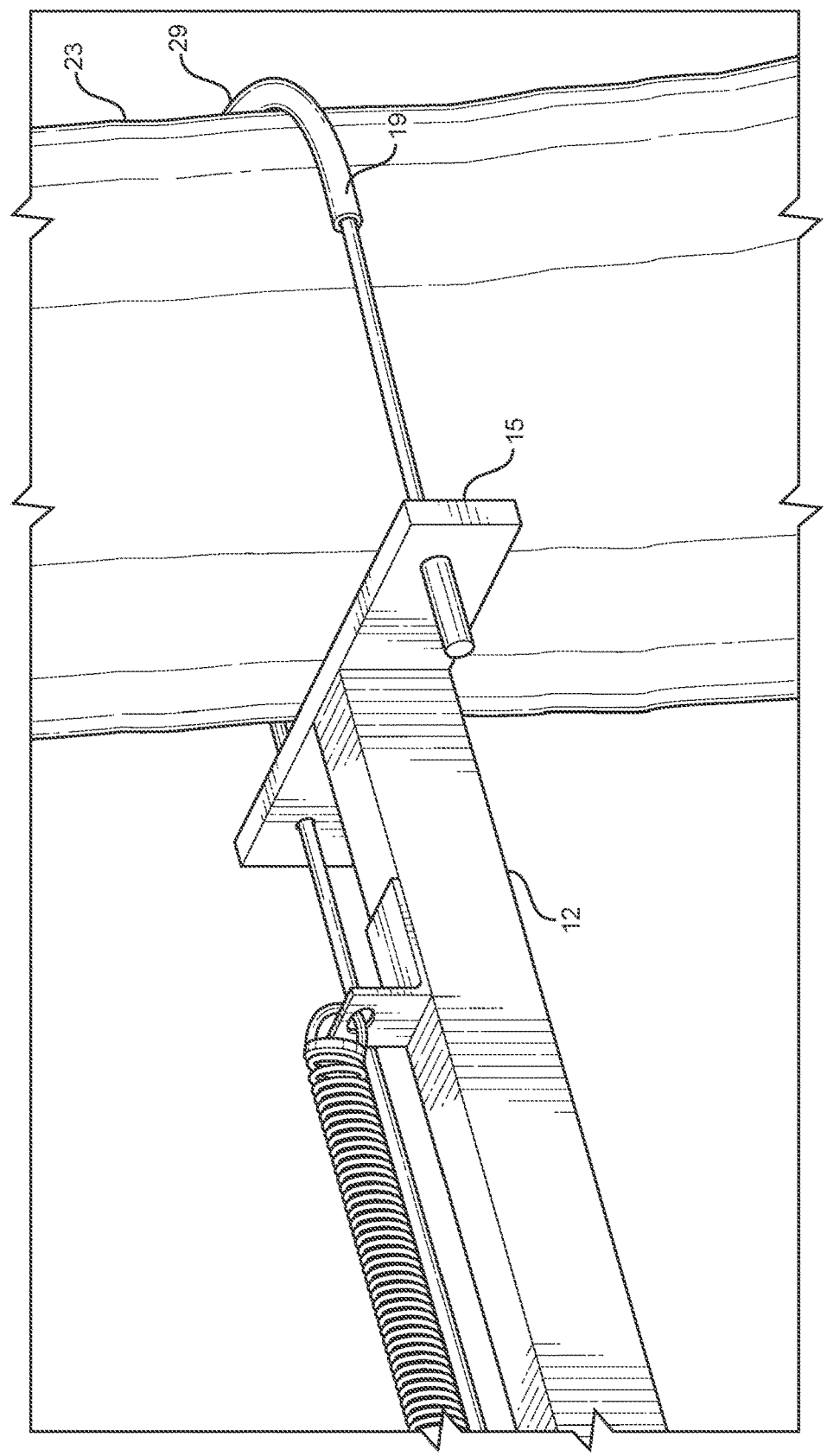
FIG. 2 shows a close-up view of the first bar of an embodiment of the tree mountable bucket in a mounted position.

Referring now to FIG. 2, there is shown a close-up view of the first bar 15 while the tree mountable bucket bracket is mounted on an upstanding column 23. The process of mounting the tree mountable bucket bracket includes the cable 19 forming a loop around the upstanding column 23. The loop is formed by the cable 19 passing through the hole of the second end of the first bar 15. Optionally, the protective sheath 29 is slid onto the cable 19 at a portion that is looped between the hole of the first end and the hole of the second end. In the illustrated embodiment, the cable 19 is connected to the chain 24. This figure shows the cable 19 through the hole in the first end secured by a ferrule stop. Other embodiments may include the cable 19 through the hole in the first end secured by a clamp, a stop, a knot or by any other known means for securing a cable that is run through a hole. This figure also displays the protective sheath 29 on the looped cable 19 opposite of the first bar 15. The second spring bracket 27 and the coil spring 28 are also visible.

The extension arm 18 is movable between a mounted position and dismounted position. In the mounted the position, the extension arm 18 is aligned with the first segment 12. In the dismounted position, the extension arm 18 is perpendicular to the first segment 12.

In the illustrated embodiment, there is a first spring bracket 26 attached to a top surface of the extension arm 18. There is a second spring bracket 27 attached to the top of the first segment 12. A coil spring 28 is connected between the first spring bracket 26 and the second spring bracket 27. The coil spring 28 is under compression when the extension arm 18 is in dismounted position. The presence of the coil spring 28 is adapted to assist the user in moving the extension arm 18 between the mounted position and the dismounted position. This embodiment will enable the user to more easily dismount the tree mountable bucket bracket with assistance from the compression of the coil spring 28.

Figure 3:
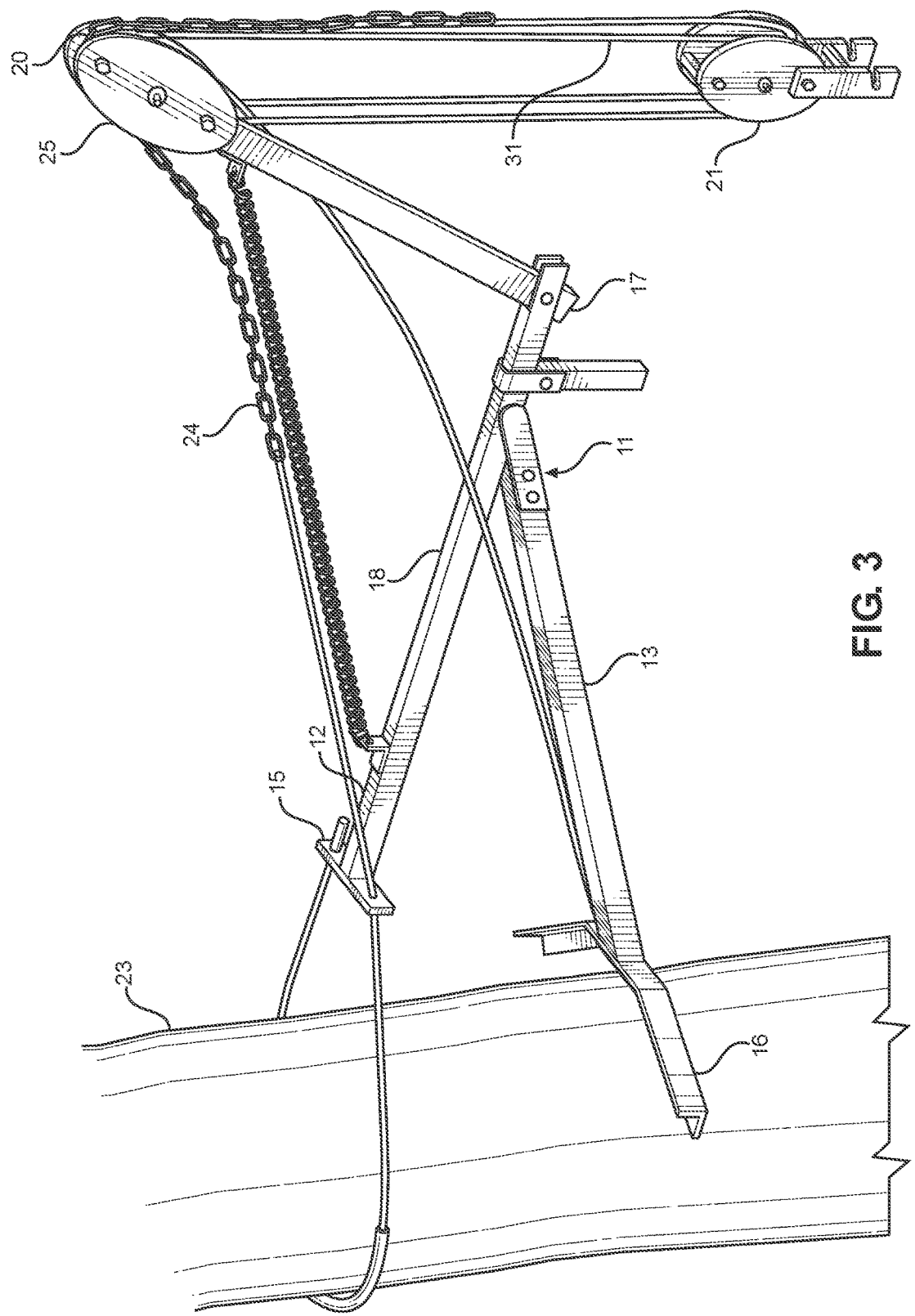
FIG. 3 shows a perspective side view of an embodiment of the tree mountable bucket bracket.

Referring now to FIG. 3, there is shown a perspective side view of the tree mountable bucket bracket in a dismounted position. The tree mountable bucket bracket can be dismounted when the user moves the extension arm 18 from the mounted position to the dismounted position. The user will remove the chain 24 from the chain slot 25. The chain 24 will be disconnected from the cable 19. The cable 19 will be pulled through the hole of the second end of the first bar 15. The cable 19 will be unwrapped around the upstanding column 23. The tree mountable bucket bracket can then be freely moved away from the upstanding column 23.

In the illustrated embodiment, there is a hollow vertical tube 30 that is affixed to the V-shaped member 11 and extends downwardly form the vertex point 14 perpendicularly relative to the first segment 12. The hollow vertical tube 30 is configured to receive a pole or similar object therein. In conjunction with the pole, the hollow vertical tube is configured to assist a user in adjusting the vertical height at which the tree mountable bucket bracket is mounted upon the upstanding column 23.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tree mountable bucket bracket comprising:
    a V-shaped member having a first segment and a second segment extending from a vertex point the first segment having a first bar attached at a free end of the first segment;
    the first bar having a first end and a second end, the first end and the second end each having a hole;
    a brace attached distally to a free end of the second segment;
    a cable secured to the first end of the first bar;
    an extension arm attached by a hinge to the V-shaped member at a point adjacent to the vertex point opposite of the first segment and the second segment, the extension arm having a chain slot disposed at a free end of the extension arm;
    a pulley attached to the extension arm opposite of the V-shaped unit;
    a chain configured to connect to the cable and interact with the chain slot.

2. The tree mountable bucket bracket of claim 1, wherein the pulley is a part of a block and tackle system.

3. The tree mountable bucket bracket of claim 1, further comprising a hollow vertical tube attached to the V-shaped member between the hinge and the vertex point extending downward perpendicular to the first segment.

4. The tree mountable bucket bracket of claim 1, further comprising a first spring bracket attached to the top side of the extension arm, a second spring bracket attached to the top side of the first segment, and a coil spring connected at an end to the first spring bracket and at another end to the second spring bracket.

5. The tree mountable bucket bracket of claim 1, further comprising a protective sheath covering a portion of the cable.

6. The tree mountable bucket bracket of claim 2, further comprising a second pulley connected to the pulley by a rope and a hook device connected to the second pulley wherein the hook device is configured to hold a feed bucket.

7. The tree mountable bucket bracket of claim 1, wherein the extension arm is movable around a hinge between a mounted position and a dismounted position wherein the dismounted position corresponds to non-tension of the cable and the mounted position corresponds to the tension of the cable.

* * * * *